(12) United States Patent
Plavetich (10) Patent No.: US 8,011,681 B2
(45) Date of Patent: Sep. 6, 2011

(54) VEHICLE STRUCTURE (75) Inventor: Richard Plavetich, Laguna Beach, CA (US)

(73) Assignee: Nissan North America, Inc., Franklin, TN (US)

( * ) Notice: Subject to any disclaimer, the term of this patent is extended or adjusted under 35 U.S.C. 154(b) by 0 days.

(21) Appl. No.: 12/720,426

(22) Filed: Mar. 9, 2010

(65) Prior Publication Data
US 2010/0164198 A1 Jul. 1, 2010

Related U.S. Application Data (63) Continuation of application No. 11/689,238, filed on Mar. 21, 2007, now Pat. No. 7,703,784.

(51) Int. Cl.
*B60R 3/02* (2006.01)
(52) U.S. Cl. ............ 280/164.1; 280/163; 280/164.2; 280/169; 280/166
(58) Field of Classification Search ............ 280/163, 280/164.2, 169, 166
See application file for complete search history.

(56) References Cited

U.S. PATENT DOCUMENTS

| | | | | |
|---|---|---|---|---|
| 1,471,972 A | * | 10/1923 | Miller | 280/166 |
| 2,951,454 A | * | 9/1960 | Candlin, Jr. | 105/447 |
| 3,488,066 A | | 1/1970 | Hansen | |
| 4,188,889 A | | 2/1980 | Favrel | |
| 4,275,664 A | | 6/1981 | Reddy | |
| 4,424,751 A | * | 1/1984 | Blochlinger | 105/447 |
| 4,842,325 A | * | 6/1989 | Irelan | 296/146.11 |
| D313,379 S | | 1/1991 | Machida et al. | |
| 5,538,265 A | * | 7/1996 | Chen et al. | 280/163 |
| 6,030,018 A | * | 2/2000 | Clare et al. | 296/37.6 |
| 6,129,401 A | | 10/2000 | Neag et al. | |
| 6,179,312 B1 | | 1/2001 | Paschke et al. | |
| 6,460,915 B1 | | 10/2002 | Bedi et al. | |
| 6,533,303 B1 | | 3/2003 | Watson | |
| 6,942,117 B2 | | 9/2005 | Foltz | |
| 6,966,593 B2 | | 11/2005 | Plentis et al. | |
| 7,017,927 B2 | * | 3/2006 | Henderson et al. | 280/166 |
| 7,118,150 B2 | | 10/2006 | Bruford et al. | |

* cited by examiner

*Primary Examiner* — J. Allen Shriver, II
*Assistant Examiner* — Bryan Evans
(74) *Attorney, Agent, or Firm* — Global IP Counselors, LLP (57) ABSTRACT A vehicle side panel step structure includes a step, a mounting structure and a sub-side body panel. The mounting structure movably couples the step to the structural support for movement of the step between a retracted step position and an extended step position relative to a structural support of the vehicle. In the extended step position the step is approximately horizontally oriented relative to a main side body panel of the vehicle. A sub-side body panel is coupled to the mounting structure to move between a fascia mating position when the step is in the retracted step position and a non-fascia mating position when the step is in the extended step position. The sub-side body panel includes a contoured edge configured such that in the retracted step position the contoured edge of the sub-side body panel and a contoured edge of the main side body panel at least partially define the wheel well.

20 Claims, 8 Drawing Sheets

VEHICLE STRUCTURE

CROSS-REFERENCE TO RELATED APPLICATIONS

This application is a continuation application of U.S. patent application Ser. No. 11/689,238 filed on Mar. 21, 2007. The entire disclosure of U.S. patent application Ser. No. 11/689,238 is hereby incorporated herein by reference.

BACKGROUND OF THE INVENTION

1. Field of the Invention

The present invention relates to a vehicle structure with a side panel step structure. More specifically, the present invention relates to a vehicle structure with a side panel step structure that is movable between a retracted step position and an extended step position.

2. Background Information

Vehicles such as pickup trucks and sports utility vehicles have large open or partially open cargo areas. Such vehicles typically have high side walls extending upward from either side of a cargo bed floor of the cargo area. Therefore, many individuals standing adjacent to forward side regions of the cargo area cannot easily access cargo placed in forward portions of the cargo area without assistance from a step ladder or step stool.

In view of the above, it will be apparent to those skilled in the art from this disclosure that there exists a need for an improved vehicle structure that improves access to the cargo area of a vehicle such as a pickup truck or sports utility vehicle. This invention addresses this need in the art as well as other needs, which will become apparent to those skilled in the art from this disclosure.

SUMMARY OF THE INVENTION

It has been discovered that in order to more easily access a forward portion of the cargo area of a vehicle such as a pickup truck, a step is advantageous.

One object of the present invention is to provide a vehicle with a retractable step structure that improves access to cargo in the cargo area of the vehicle.

Another object of the present invention is to provide a vehicle structure with a retractable step structure that moves between an extended orientation and a retracted orientation.

Still another object of the present invention is to provide a vehicle structure with a retractable step structure that conceals the step when the step is retracted.

In accordance with one aspect of the present invention, a vehicle structure includes a structural support, a vehicle cargo area, a main side body panel and a vehicle side panel step structure. The vehicle cargo area has first and second sides with an open upper end. The main side body panel extends along one of the first and second sides of the vehicle cargo area, with the main side body panel having a first contoured edge that partially defines a wheel well. The vehicle side panel step structure includes a step, a mounting structure and a sub-side body panel. The mounting structure movably couples the step to the structural support for movement of the step between a retracted step position and an extended step position relative to the structural support. In the extended step position the step is approximately horizontally oriented relative to the main side body panel. The sub-side body panel is coupled to the mounting structure to move between a fascia mating position when the step is in the retracted step position and a non-fascia mating position when the step is in the extended step position. The sub-side body panel includes a second contoured edge configured such that in the retracted step position the first and second contoured edges at least partially define the wheel well.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
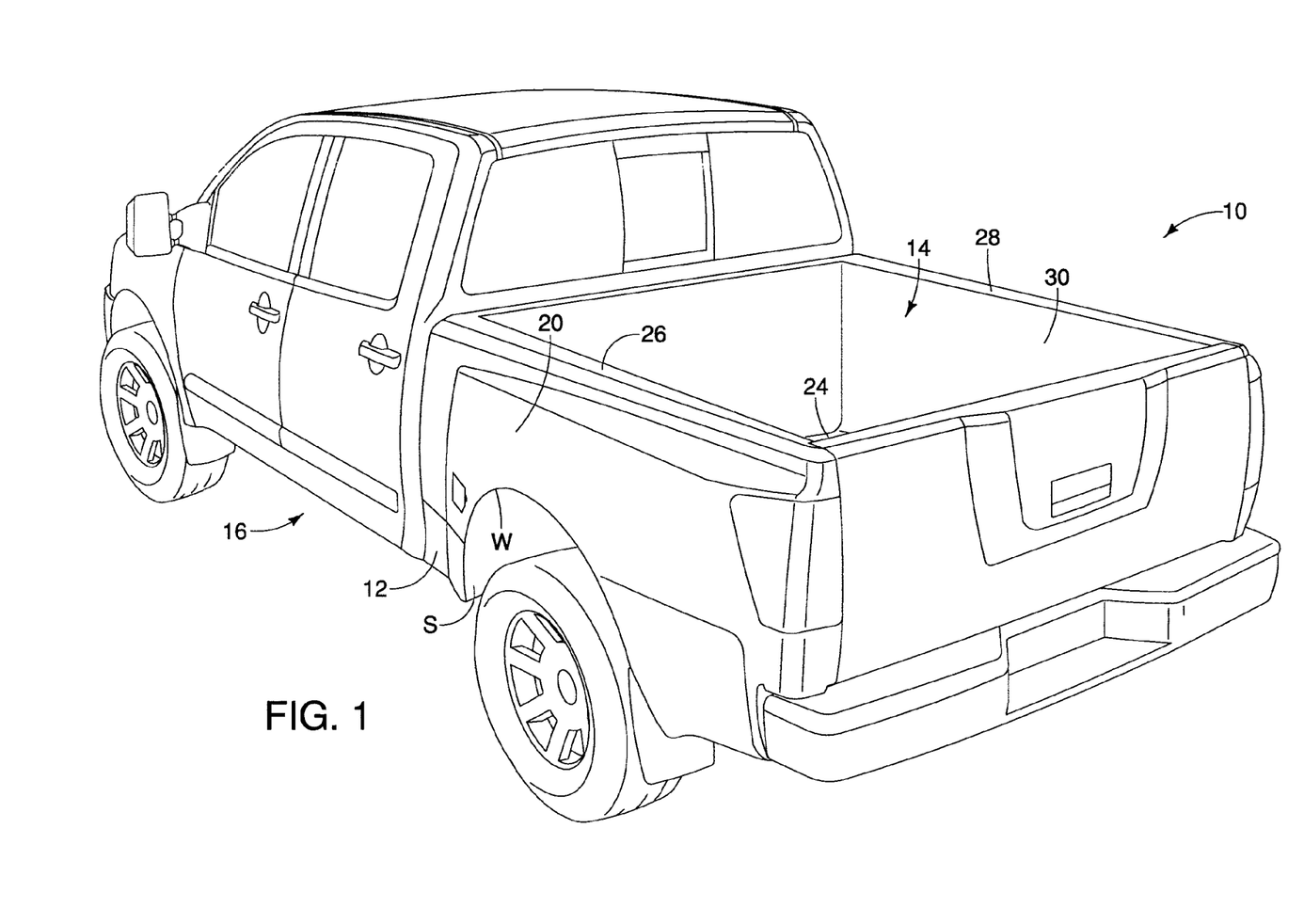
FIG. 1 is a perspective view of a vehicle showing a vehicle structure with a vehicle cargo area that includes a concealed side panel step structure in accordance with the present invention.

Referring initially to FIG. 1, a vehicle 10 having a side panel step structure 12 is illustrated in accordance with a first embodiment of the present invention. The side panel step structure 12 is movable between a retracted step position shown in FIGS. 1-3, 5, 7 and 11, and an extended step position shown in FIGS. 4, 6, 8 and 13. In the extended step position shown in FIGS. 4, 6, 8 and 13, the side panel step structure 12 provides improved access to a cargo area 14 of the vehicle 10. In the retracted step position shown in FIGS. 1-3, 5, 7 and 11 the side panel step structure 12 is almost completely concealed.

As shown in FIG. 1, the vehicle 10 has a vehicle structure 16 that includes the cargo area 14, structural supports 18 (shown in FIGS. 5-8 and 11-13), a main side body panel 20 and the side panel step structure 12.

Figure 3:
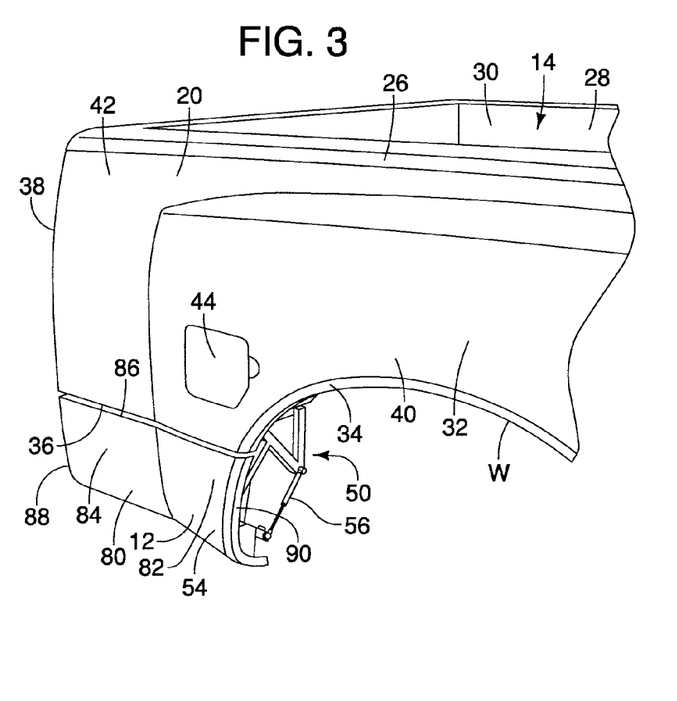
FIG. 3 is a perspective view of the vehicle cargo area shown in FIG. 2, showing the step structure in a retracted step position in accordance with the present invention.
Figure 4:
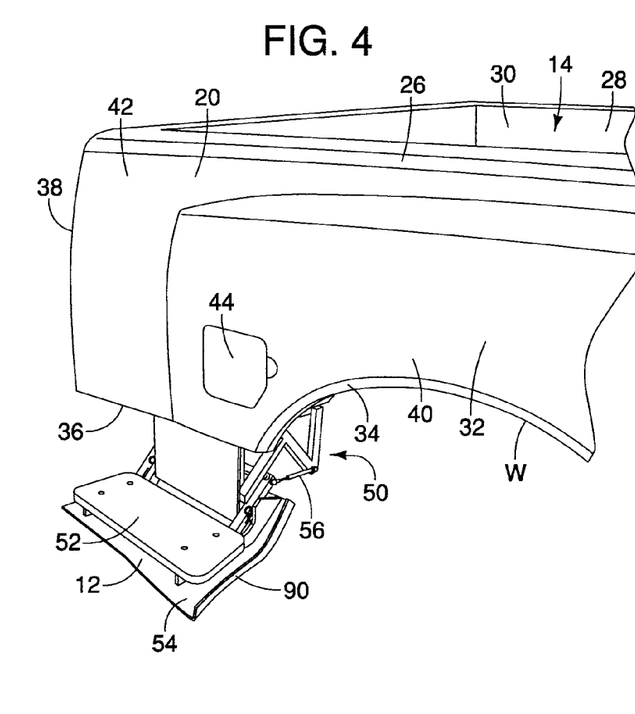
FIG. 4 is another perspective view of the vehicle cargo area similar to FIG. 3, showing the step structure in a extended step position in accordance with the present invention.
Figure 5:
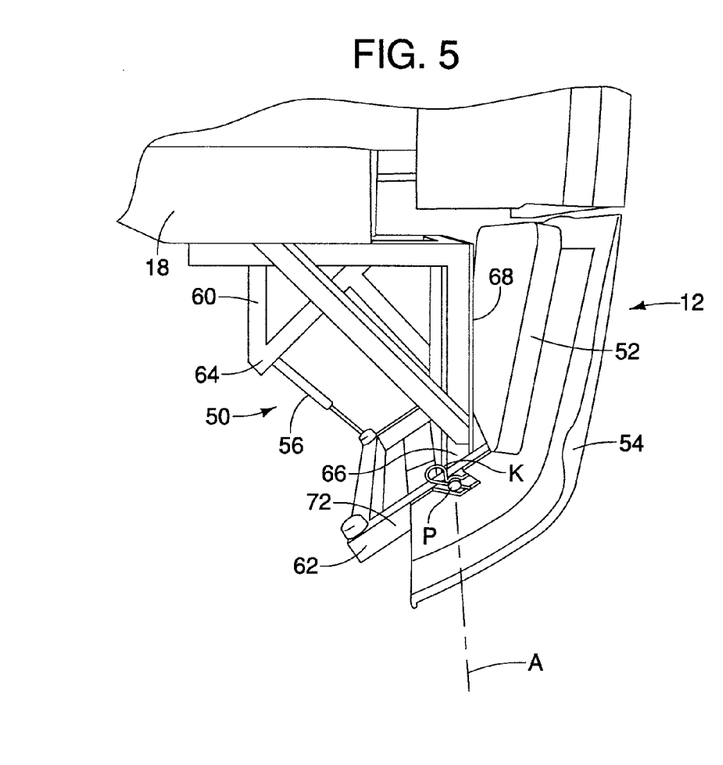
FIG. 5 is a front elevational view of the vehicle cargo area looking in a rearward direction showing the step structure in the retracted step position in accordance with the present invention.
Figure 6:
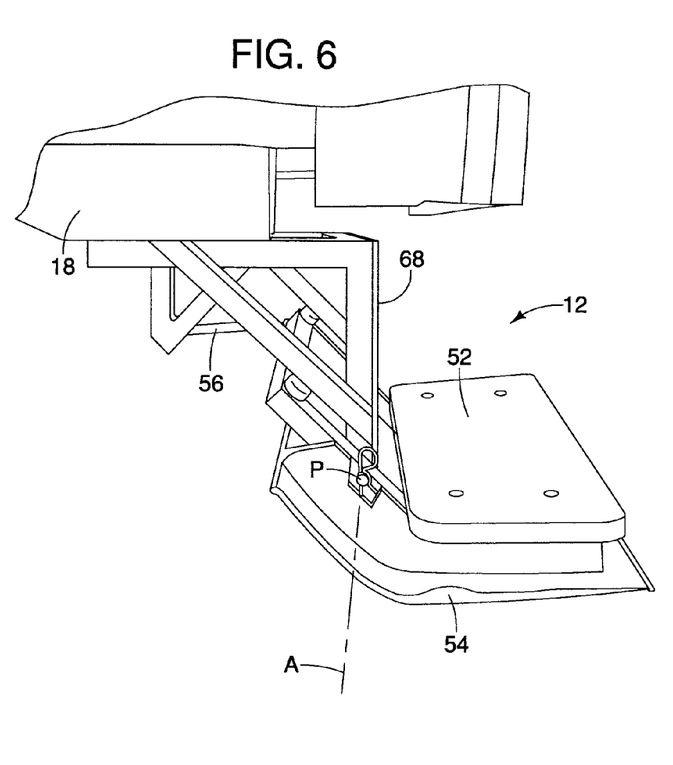
FIG. 6 is a front elevational view of the vehicle cargo area looking in a rearward direction showing the step structure in the extended step position in accordance with the present invention.
Figure 7:
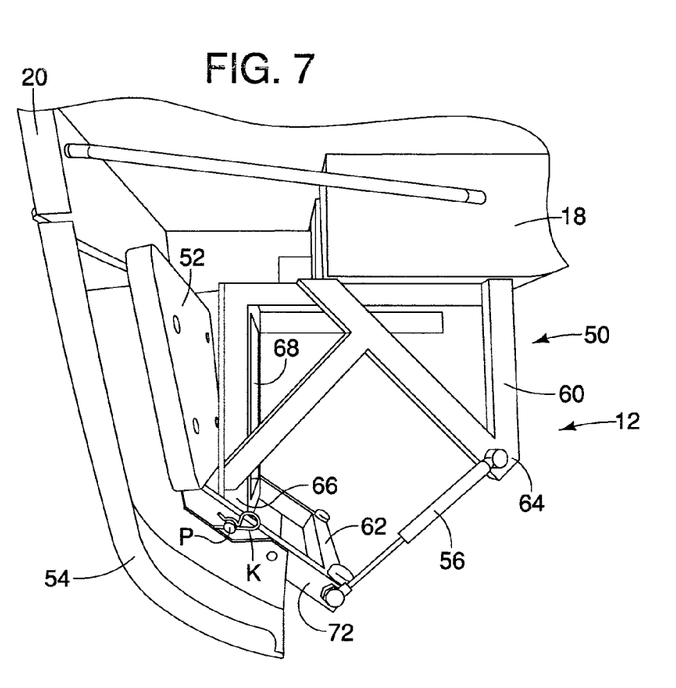
FIG. 7 is a rear elevational view of the vehicle cargo area looking in a forward direction showing the step structure in the retracted step position in accordance with the present invention.
Figure 8:
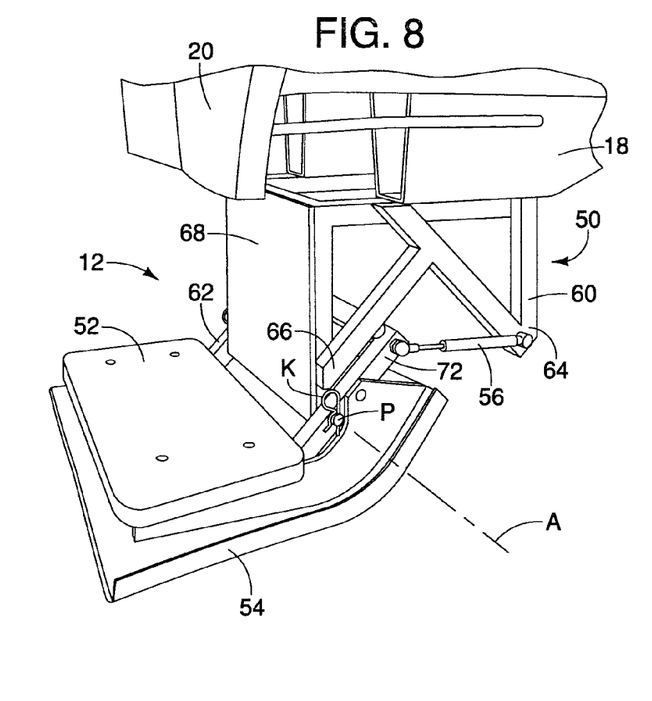
FIG. 8 is a rear perspective view of the vehicle cargo area looking in a forward direction showing the step structure in the extended step position in accordance with the present invention.

As shown in FIGS. 1, 3 and 4, the cargo area 14 includes a pickup truck style cargo bed 24 (shown only in FIG. 1), a first side 26, a second side 28 and an open upper end 30. It should be appreciated that the cargo area 14 can alternatively be covered or partially covered, such as a pickup truck with a removable cover or an SUV (sports utility vehicle).

As indicated in FIGS. 5-8 and 11-13, the structural supports 18 are structural elements of the vehicle 10 that extend under the cargo bed 24. Preferably, the cargo bed 24 is rigidly attached to the structural supports 18 by fasteners (not shown) or conventional welding techniques. Since the cargo bed 24 and the cargo area 14 are conventional portions of a vehicle such as a pickup truck, further description is omitted for the sake of brevity.

Figure 2:
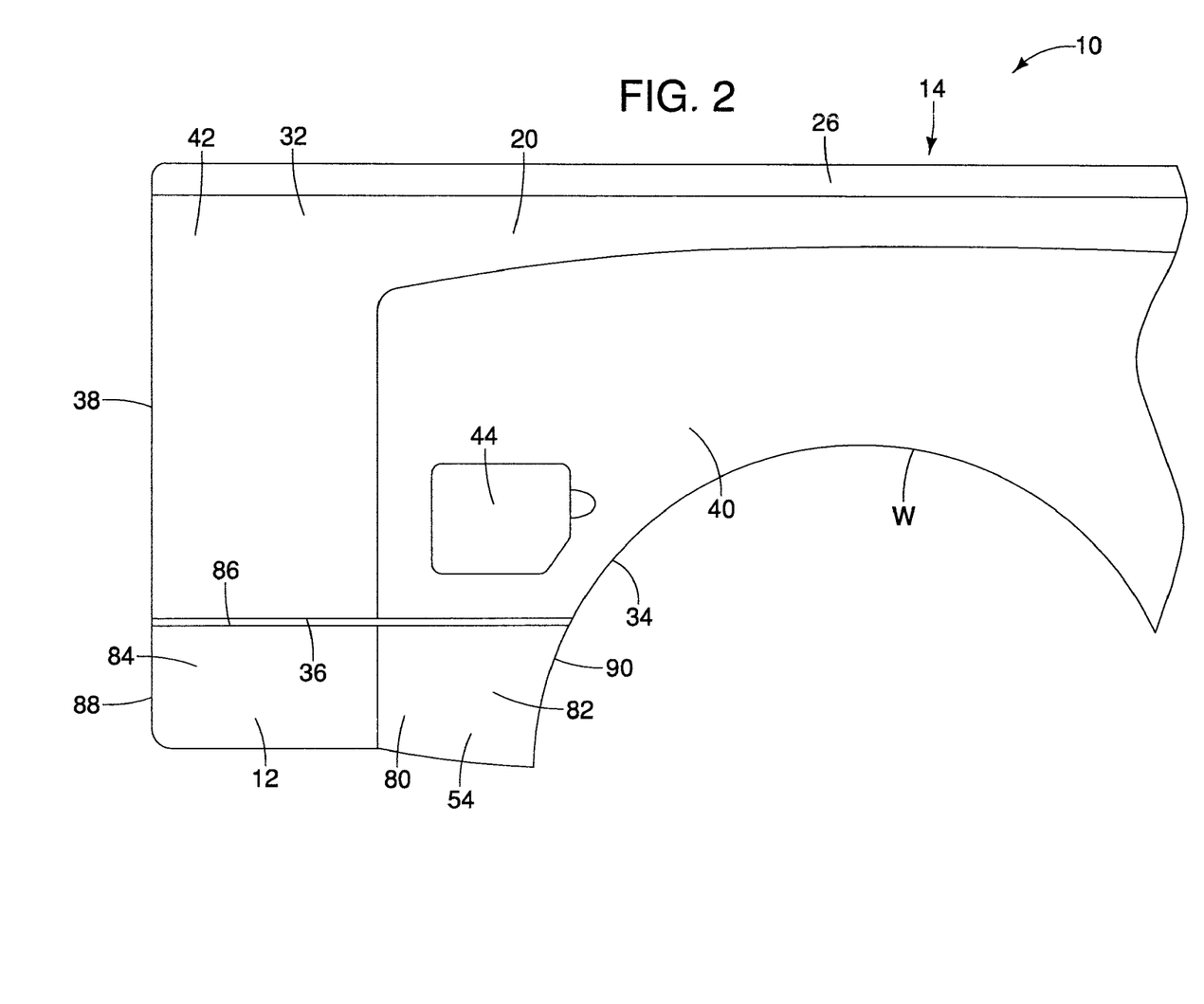
FIG. 2 is a side elevational view of the vehicle cargo area removed from the vehicle showing outer surface features of a main side body panel and a sub-side body panel that conceals the step structure in accordance with the present invention.

With specific reference to FIGS. 2, 3 and 4, a description of the main side body panel 20 is now provided. The main side body panel 20 at least partially forms the first side 26 of the cargo area 14. The main side body panel 20 is preferably made of metal, but can alternatively be made of plastic, composite or fiberglass materials. The main side body panel 20 is preferably an integral part of the cargo bed 24 and is attached to other portions of the cargo bed 24 by fasteners (not shown) or conventional welding techniques. The main side body panel 20 extends along the first side 26 of the cargo area 14.

The main side body panel 20 basically includes an outer surface 32, a first contoured edge 34, a second contoured edge 36 and a first curved edge (a front edge) 38.

The outer surface 32 includes a first contoured surface portion 40 and a second contoured surface portion 42. As shown in FIG. 2, the first contoured surface 40 has a box-like shape in side view that is interrupted by a fuel tank access door 44 and the first contoured edge 34. However, as indicated in FIGS. 3 and 4, the first contoured surface 40 is curved, extending outward from the second contoured surface portion 42. The second contoured surface portion 42 is less pronounced having a less noticeable curve in the vertical direction. The overall shape of the first contoured surface portion 40 at least partially forms a first outer surface shape described below.

The second contoured surface portion 42 extends in a vehicle longitudinal direction from the first contoured surface portion 40 to the first curved edge 38 of the main side body panel 20. The second contoured surface portion 42 also extends in a vertical direction upward from the second contoured edge 36 to an upper edge of the main side body panel 20. The overall shape of the second contoured surface portion 42 at least partially forms a second outer surface shape also described in greater detail below.

The first contoured edge 34 of the main side body panel 20 has an arcuate shape, as shown in FIGS. 2, 3 and 4. The first contoured edge 34 at least partially defines a rear wheel well W of the vehicle 10.

It should be appreciated from the drawings, that the rear wheel well W includes a wheel well shield S or liner that is only shown in FIG. 1. The shield S is removed from all other drawings in order to reveal details of the side panel step structure 12.

The second contoured edge 36 extends in a vehicle longitudinal direction along both the first and second contoured surface portions 40 and 42. From the side view shown in FIG. 2, the second contoured edge 36 appears to be straight. However, as indicated in FIGS. 3 and 4, the second contoured edge 36 of the main side body panel 20 follows the profiles of the first and second contoured surface portions 40 and 42.

The first curved edge 38 of the main side body panel 20 defines a front edge or front outer corner of the cargo area 14. The first curved edge 38 extends in a vertical direction along the second contoured surface portion 42. Hence, in the side view of FIG. 2, the first curved edge 38 appears to be straight. However, as indicated in FIGS. 2 and 3, the first curved edge 38 follows the convex profile of the second outer surface shape of the second contoured surface portion 42.

With specific reference to FIGS. 5-13, a description of the side panel step structure 12 is now provided. The side panel step structure 12 basically includes a mounting structure 50, a step 52, a sub-side body panel 54 and an over-the-center biasing member 56. The mounting structure 50 movably couples the step 52 to the structural supports 18 for movement of the step 52 between the retracted step position (FIGS. 1-3, 5, 7 and 11) and the extended step position (FIGS. 4, 6, 8 and 13) relative to the structural support 18 such that in the extended step position the step 52 is approximately horizontally oriented relative to the main side body panel 20.

Figure 9:
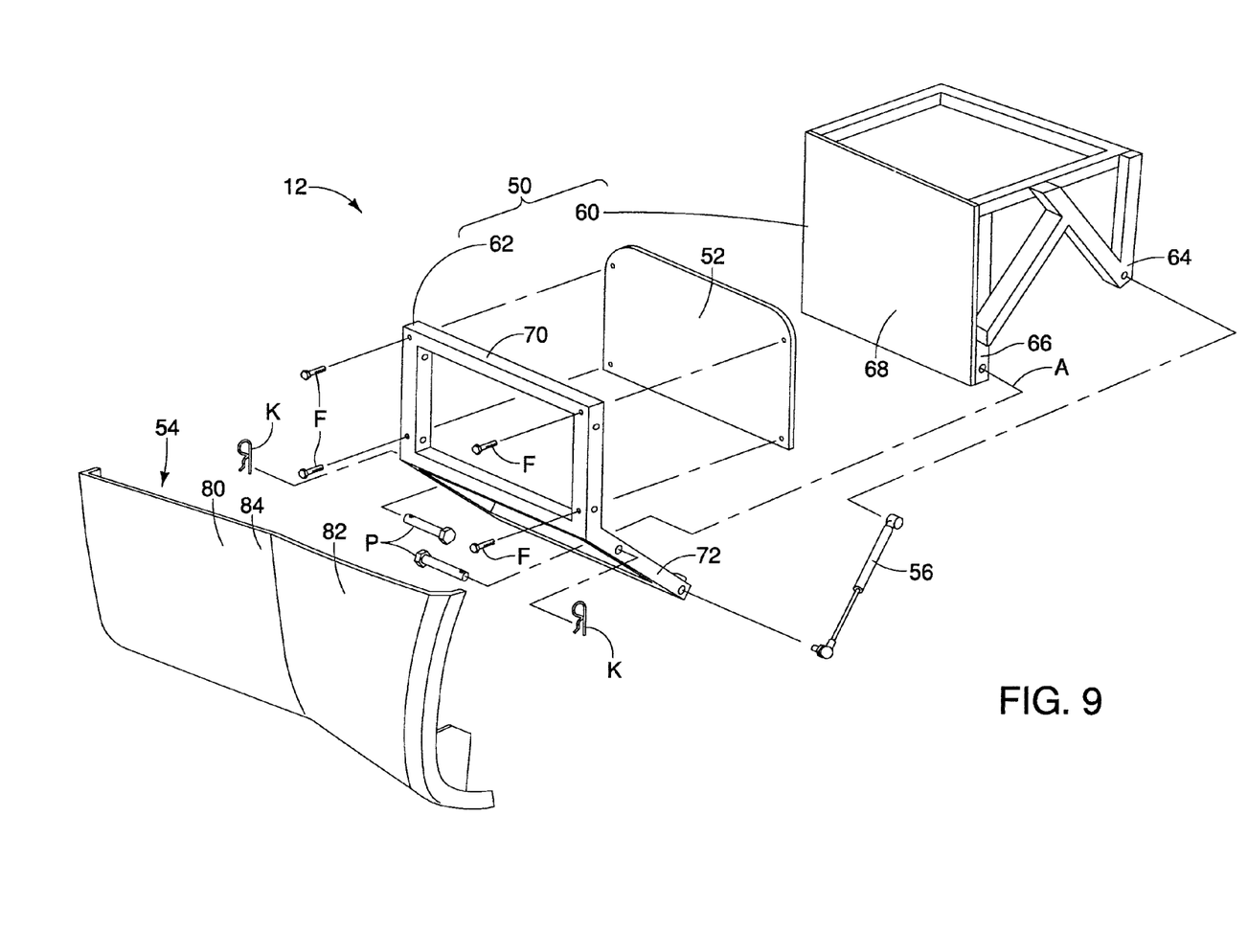
FIG. 9 is a perspective exploded view of the step structure shown removed from the vehicle cargo area showing the sub-side body panel, a step frame, a step, a mounting structure and a biasing member oriented in the retracted step position in accordance with the present invention.
Figure 10:
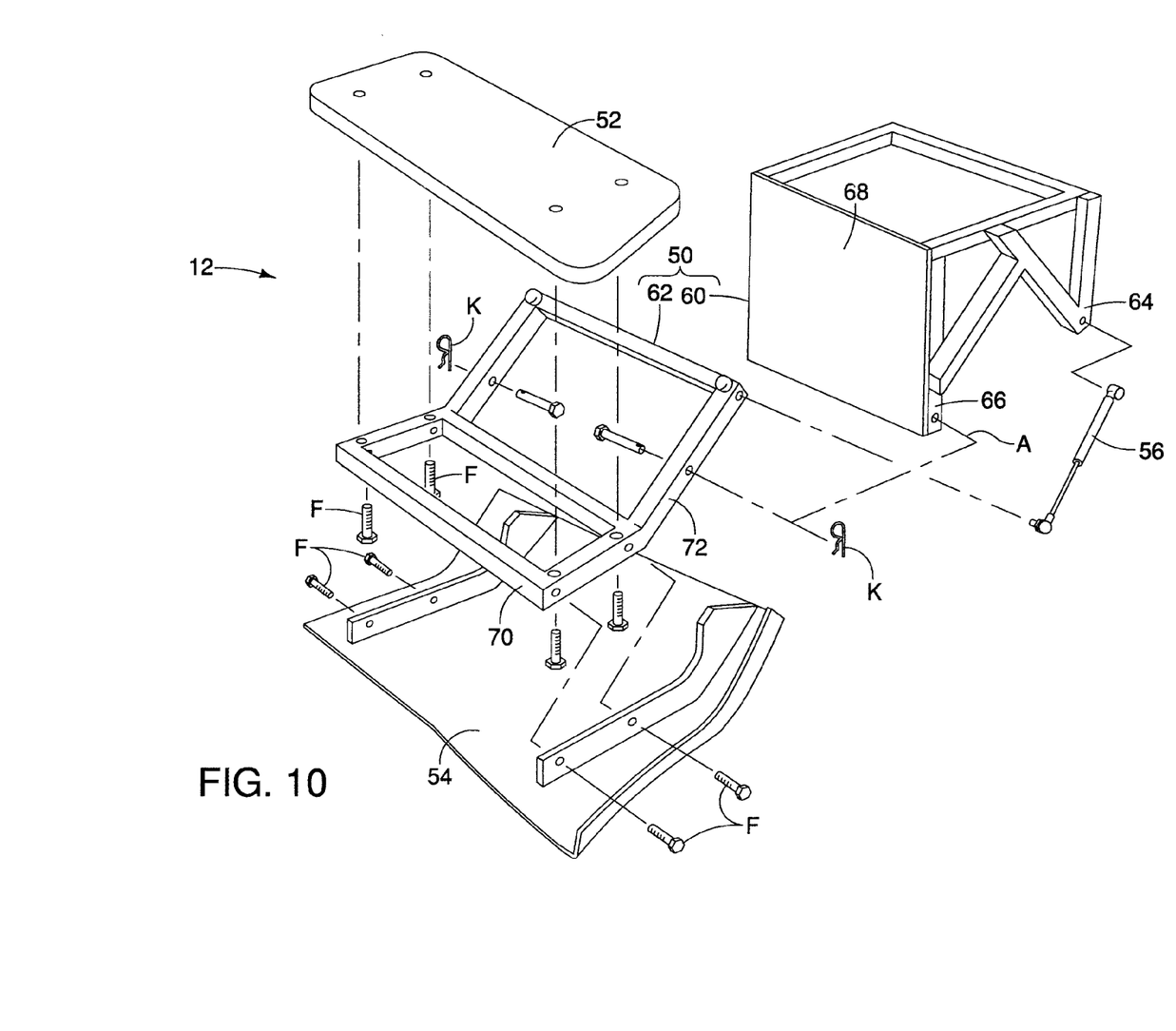
FIG. 10 is a perspective exploded view of the step structure shown removed from the vehicle cargo area showing the sub-side body panel, the step frame, the step, the mounting structure and the biasing member oriented in the extended step position in accordance with the present invention.

As shown more clearly in FIGS. 9 and 10, the mounting structure 50 basically includes a support frame 60 and a step frame 62. The support frame 60 is fixed to the structural supports 18 by fasteners (not shown) or conventional welding techniques. The support frame 60 includes biasing member mounting portion 64 and a pivot portion 66. The biasing member mounting portion 64 is preferably spaced apart from the pivot portion 66 in order to provide leverage for the operation of the biasing member 56 (described below). The pivot portion 66 includes a pivot axis A that extends in a vehicle longitudinal direction and in a direction that is substantially parallel to a longitudinal direction of the main side body panel 20. The pivot axis A also extends in a direction substantially parallel to a longitudinal direction of the step 52. Further, the pivot portion 66 pivotally supports the step frame 62 for rotation about the pivot axis A.

The support frame 60 of the mounting structure 50 is depicted as a series of metallic members welded or otherwise fixed together at supporting angles much like the construction of a truss. However it should be understood from the drawings and the description herein that the overall shape and structural orientation of the mounting structure 50 is not limited to the depicted design, but rather can be constructed in any of a variety of configurations and orientations that provide the overall use and function of the present invention. Specifically, the support frame 60 of mounting structure 50 can have any of a variety of shapes and configuration that include the biasing mounting portion 64 and the pivot portion 66. Further, in the depicted embodiment, the mounting structure 50 includes a riser or kick panel 68 (see FIGS. 5-10). The kick panel 68 is an optional element that can be omitted if desired.

The step frame 62 is pivotally coupled to the structural supports 18 (via the support frame 60) for pivotal movement between the extended step position and the retracted step position. Specifically, the step frame 62 pivotally coupled to the support frame 60 by pivot pins P such that the step frame 62 is pivotable about the pivot axis A. The pivot pins P are retained in position by keys K.

The step frame 62 basically includes a step attachment portion 70 and a biasing member attachment portion 72. As best shown in FIGS. 9 and 10, the step frame 62 can be constructed as a series of metallic members welded or otherwise rigidly fixed to one another to form two attached rectangular frame portions. Specifically, the step attachment portion 70 has a shape that approximates a rectangle and the biasing member attachment portion 72 has a shape that also approximates a rectangle. The step attachment portion 70 and the biasing member attachment portion 72 are not co-planar but rather lie in planes that are angularly offset from one another. The angle between the step attachment portion 70 and the biasing member attachment portion 72 can be any of a variety of angles depending upon the strength and size of the biasing member 56. Specifically, the angle between the step attachment portion 70 and the biasing member attachment portion 72 is provided in order to provide the biasing member 56 with leverage to urge the step frame 62 and the step 52 to remain in the extended step position and in the retracted step position.

As shown in FIGS. 9 and 10, the step 52 is rigidly fixed to the step frame 62 by fasteners F. As shown in FIG. 10, the sub-side body panel 56 is also fixed to the step frame 62 by fasteners F. However, the step 52 is fixed to a first side of the step attachment portion 70 of the step frame 62 and the sub-side body panel 56 is fixed to a second side of the step attachment portion 70 of the step frame 62.

With reference to FIGS. 2 and 3, a description of the sub-side body panel 54 is now provided. The sub-side body panel 54 basically includes an outer surface 80 that has a third contoured surface portion 82, a fourth contoured surface portion 84, a top edge 86, a front edge 88 and a contoured edge 90 (a third contoured edge).

The overall shape and contours of the outer surface 80 of the sub-side body panel 54 are configured to compliment and conform to the overall shape and contours of the main side body panel 20. Specifically, the outer surface 80 of the sub-side body panel 54 is designed to conceal the side panel step structure 12 with the side panel step structure 12 in the retracted step position.

As described below, the sub-side body panel 54 is coupled to the mounting structure 50 to move between a fascia mating position (FIGS. 1-3, 5 and 7) when the step 52 is in the retracted step position and a non-fascia mating position (FIGS. 4, 6 and 8) when the step 52 is in the extended step position.

The third contoured surface portion 82 continues the overall shape established by the first contoured surface portion 40 of the outer surface 32 of the main side body panel 20. More specifically, the overall shapes of the first and third contoured surface portions 40 and 82 conform to one another in the fascia mating position to form the first outer surface shape.

The fourth contoured surface portion 84 continues the overall shape established by the second contoured surface portion 42 of the outer surface 32 of the main side body panel 20. More specifically, the overall shapes of the second and fourth contoured surface portions 42 and 84 conform to one another in the fascia mating position to form the second outer surface shape.

The top edge 86 of the sub-side body panel 54 is contoured to conform to the overall shape of the second contoured edge 36 of the main side body panel 20. Specifically, the top edge 86 extends along the third contoured surface portion 82 and the fourth contoured surface portion 84 such that the top edge 86 and second contoured edge 36 extend adjacent to one another with the sub-side body panel 54 in the fascia mating position. Consequently, the overall shape and appearance of the sub-side body panel 54 and the main side body panel 20 is such that from a distance the sub-side body panel 54 and the main side body panel 20 appear to be one member with the top edge 86 and the second contoured edge 36 provide the appearance of decorative seam or decorative crease.

It should be understood from the drawings and the description herein that the depicted first outer surface shape defined by the first and third contoured surface portions 40 and 82 and second outer surface shape defined by the second and fourth contoured surface portions 42 and 84 are only one example of possible outer surface shapes of the main side body panel 20 and the sub-side body panel 54. In the depicted embodiment, the first and second outer surface shapes differ and provide a decorative appearance to the first side 26 of the cargo area 14. Alternatively, the first and second outer surface shapes can be the same such that there is only one outer surface shape between the main side body panel 20 and the sub-side body panel 54. Further, the first and second outer surface shapes can vary from vehicle to vehicle depending upon overall vehicle configuration and aesthetic design of the vehicle.

As shown in FIGS. 3 and 4, the sub-side body panel 54 is movable from the fascia mating position to the non-fascia mating position such that the top edge 86 (a contoured edge) moves outwardly and downwardly with respect to the second contoured edge 36 of the main side body panel 20.

The front edge 88 is shaped to conform to the shape of the first curved edge 38 of the main side body panel 20. More specifically, the front edge 88 (a second curved edge) and the first curved edge 38 are aligned with one another with the sub-side body panel 54 in the fascia mating position. Further, the front edge 88 and first curved edge 38 at least partially form an outer front corner of the cargo area 14 of a vehicle 10.

The sub-side body panel 54 includes the contoured edge 90 that is configured such that in the retracted step position the first contoured edge 34 of the main side body panel 20 and contoured edge 90 together define an overall curved shape of the rear wheel well W. Further, the contoured edge 90 of the sub-side body panel 54 defines a lower forward portion of the wheel well W with the sub-side body panel 54 in the fascia mating position. The first contoured edge 34 of the main side body panel 20 defines an upper forward portion of the wheel well W and a rear portion of the wheel well W.

As indicated in FIGS. 9 and 10, the sub-side body panel 54 is fixed to the step frame 62. Consequently, the sub-side body panel 54 moves with the step frame 62 for pivotal movement about the pivot axis A. Furthermore, the sub-side body panel 54 is in the fascia mating position when the step 52 is in the retracted step position and the sub-side body panel 54 is in the non-fascia mating position when the step 52 is in the extended step position. However, it should be understood from the drawings and the description herein that the sub-side body panel 54 can be coupled to the step frame 62 with additional linkage (not shown) that allows the sub-side body panel 54 to move relative to the step frame 62. For example, the sub-side body panel 54 can be coupled to the step frame 62 in order to move the sub-side body panel 54 further under the cargo area 14 in order to provide additional clearance.

Figure 11:
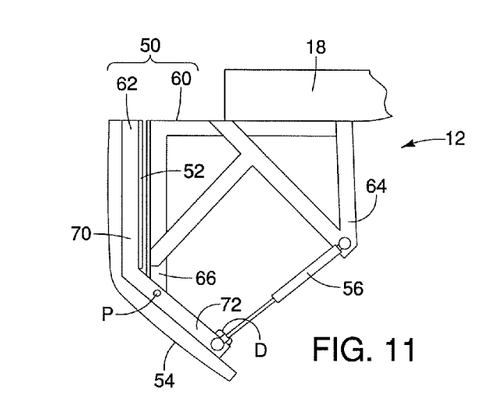
FIG. 11 is a schematic rear view of the step structure looking in a forward direction with the step structure in the retracted step position showing the biasing member exerting a first force on the step frame retaining the step structure in position in accordance with the present invention.
Figure 12:
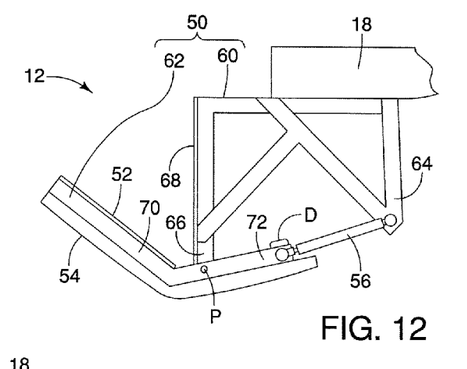
FIG. 12 is a schematic rear view of the step structure looking in a forward direction with the step structure in an intermediate position showing the biasing member in a compressed state with the step structure in an intermediate position approximately mid-way between the retracted step position and the extended step position in accordance with the present invention.
Figure 13:
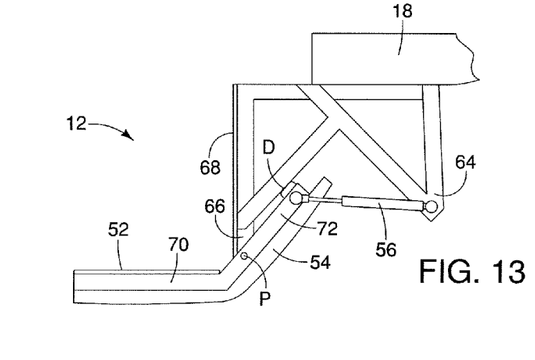
FIG. 13 is a schematic rear view of the step structure looking in a forward direction with the step structure in the extended step position showing the biasing member exerting a second force on the step frame retaining the step structure in position in accordance with the present invention.

With specific reference to FIGS. 11, 12 and 13, a description of the biasing member 56 is now provided. The biasing member 56 preferably a piston/cylinder assembly that either has an internal compression spring (not shown) or compressible gas within the body of the biasing member 56. In operation, the biasing member 56 is configured to be elongated. Pressure exerted on ends of the biasing member 56 cause the biasing member to exert an increasing amount of force the shorter the overall length of the biasing member 56.

The biasing member 56 (an over-the-center biasing member) is operably coupled between the support frame 60 and the step frame 62 biasing the step frame 62 into the retracted step position shown in FIG. 11 and biasing the step frame 62 into the extended step position shown in FIG. 13. As described above, the mounting structure 50 movably couples the step 52 to the structural supports 18 for movement of the step 52 between the retracted step position and the extended step position relative to the structural supports 18. However, as shown in FIG. 12, an intermediate overcenter position of the step 52 is located between the retracted and extended step positions. As shown in FIG. 13, a distal end D of the step frame 62 located inboard relative to the pivot axis P, contacts the support frame 60 with the step 52 in the extended step position. However, as shown in FIGS. 11 and 12, when the step 52 is not in the extended step position, the distal end D does not contact the support frame 60.

One end of the biasing member 56 is pivotally attached to the biasing mounting portion 64 of the support frame and the other end of the biasing member 56 is pivotally attached to the biasing member attachment portion 72 of the step frame 62. Consequently, the biasing member 56 applies a first urging force for maintaining the step 52 in the retracted step position (FIG. 11) when the step 52 is in the retracted step position. The biasing member 56 also applies a second urging force for maintaining the step 52 in the extended step position (FIG. 13) when the step 52 is in the extended step position. Further, the biasing member 56 applies a third urging force when the step 52 is moved between the retracted step position and the extended step position thereby moving past the overcenter position (FIG. 12). The first, second and third urging forces can all be the same or can be different depending upon the configuration of the biasing member 56.

The third urging force is greater than either of the first urging force or the second urging force. Therefore, when the step 52 in the overcenter position depicted in FIG. 12, as an individual pushes the sub-side body panel 54 movement into either of the extended step position or the retracted step position, the movement is made easier by the force of the biasing member 56.

As indicated in FIGS. 11-13, the side panel step structure 12 is a manually operated mechanism where the user pulls the sub-side body panel 54 outward and downward to move the step 52 from the concealed retracted step position (FIG. 11) past the intermediate position (FIG. 12) and into the extended step position (FIG. 13). The force required to move the step 52 from the retracted step position (FIG. 11) depends on the first urging force applied by the biasing member 56 and the kinematics defined by the pivot axis A and the relative dimensions of the step frame 62. It should be understood from the drawings and description herein that the dimensions of the step frame 62 and the level of force applied by the biasing member 56 are easily adjusted to provide a desired level of force required to manually operate the side panel step structure 12.

The specific embodiment depicted in the drawings and described herein show the side panel step structure 12 located at a forward portion of the rear wheel well W. Specifically, the depicted embodiment shows the side panel step structure 12 at least partially defining a forward portion of the wheel well W. However, it should be understood from the drawings and the description herein that the side panel step structure 12 can alternatively be mounted at a rearward position relative to the rear wheel well W. More specifically, the sub-side body panel 54 can be modified such that the sub-side body panel 54 at least partially defines a rearward portion of the rear wheel well W.

The various portion of the vehicle 10 apart from the cargo area 14 are conventional components that are well known in the art. Since vehicles 10 such as pickup trucks and SUVs are well known in the art, these structures will not be discussed or illustrated in detail herein. Rather, it will be apparent to those skilled in the art from this disclosure that the components can be any type of structure and/or programming that can be used to carry out the present invention.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. An access structure for a vehicle having a structural support, the access structure comprising:
    a mounting structure pivotally coupled to the structural support for pivoting movement about the pivot axis, the mounting structure including a first frame section and a second frame section that are rigidly fixed to one another such that the first frame section is located on a first side of the pivot axis and the second frame section is located on a second side of the pivot axis opposite the first frame section, the first frame section and the second frame section extending from the pivot axis to form an obtuse angle therebetween; and
    a step rigidly fixed to the first frame section such that the step moves with the first frame section about the pivot axis between a retracted position and an extended position such that in the retracted position a distal end of the second frame section is spaced apart from the structural support and located inboard of the pivot axis and the step is in a substantially non-horizontal orientation and such that in the extended position the distal end of the second frame section contacts the structural support and the step is in a substantially horizontal orientation.

2. The access structure according to claim 1, further comprising
    a biasing member coupled between the structural support and the mounting structure and configured to bias the step into the extended position.

3. The access structure according to claim 2, wherein
    the biasing member biases the step into the retracted position.

4. The access structure according to claim 1, further comprising
    a biasing member coupled between the structural support and the mounting structure and configured to bias the step into the retracted position.

5. The access structure according to claim 2, wherein
    the mounting structure and the biasing member are connected to one another at a point such that with the step in the retracted position the point is positioned vertically below the step and with the step in the extended position the point is located vertically above the step.

6. The access structure according to claim 1, wherein
    the pivot axis extends in a direction substantially parallel to a longitudinal direction of the vehicle.

7. The access structure according to claim 1, wherein
    the step is fixed to a first side of the first frame section and a minor body panel is fixed to an opposite side of the first frame section.

8. The access structure according to claim 7, wherein
    the minor body panel conforms in overall shape and dimensions to the obtuse angle formed between the first and second frame sections.

9. The access structure according to claim 7, wherein
    a major body panel is fixedly coupled to the structural support such that the minor body panel moves with the mounting structure between a fascia mating position with the step in the retracted position and a non-fascia mating position with the step in the extended position.

10. The access structure according to claim 9, wherein
    the major body panel has a first contoured edge that partially defines a wheel well, and
    the minor body panel includes a second contoured edge configured such that in the retracted position the first and second contoured edges cooperate to at least partially define the wheel well.

11. The access structure according to claim 9, wherein
    the major body panel has an outer surface that includes a first contoured surface portion, and
    the minor body panel has an outer surface that includes a second contoured surface portion, with overall shapes of the first and second contoured surface portions conforming to one another to form a first outer surface shape with the minor body panel in the fascia mating position.

12. The access structure according to claim 9, wherein
    the major body panel includes a first contoured edge, and
    the minor body panel includes a second contoured edge, the first and second contoured edges extending adjacent to one another with the minor body panel in the fascia mating position.

13. The access structure according to claim 12, wherein
    the minor body panel is movable from the fascia mating position to the non-fascia mating position such that the second contoured edge moves outwardly and downwardly with respect to the first contoured edge.

14. The access structure according to claim 10, wherein
    the second contoured edge of the minor body panel defines a lower-forward portion of the wheel well with the minor body panel in the fascia mating position.

15. The access structure according to claim 1, wherein
    the distal end of the second frame section is positioned at a vertical location below the step when the step is in the retracted position and is positioned at a vertical location above the step when the step is in the extended position.

16. The access structure according to claim 1, wherein
    the second frame section of the mounting structure includes a bumper positioned to contact a corresponding section of the structural support when the step is in the extended position.

17. The access structure according to claim 1, wherein
    the structural support includes a recess, and
    the second frame section of the mounting structure is at least partially received within the recess when the step is in the extended position.

18. The access structure according to claim 12, wherein
    the second contoured edge of the minor body panel extends from a wheel well to a front edge of the major body panel.

19. The access structure according to claim 1, wherein
    the first frame section has an overall rectangular shape and the second frame section has an overall rectangular shape, the overall rectangular shapes being rigidly fixed to one another forming a single rigid monolithic structure.

20. The access structure according to claim 1, wherein
    the first frame section has a side surface that extends from the pivot axis and the second frame section has a side surface that extends from the pivot axis, the side surface of the first frame section and the side surface of the second frame section being co-planar.

* * * * *